United States Patent [19]
Tokoi

[11] Patent Number: 6,092,411
[45] Date of Patent: Jul. 25, 2000

[54] ROUNDNESS MEASURING INSTRUMENT AND MEASURING HEAD CALIBRATION METHOD THEREFOR

[75] Inventor: Yasuyuki Tokoi, Mitaka, Japan

[73] Assignee: Tokyo Seimitsu Co., Ltd., Tokyo, Japan

[21] Appl. No.: 09/221,159

[22] Filed: Dec. 28, 1998

[51] Int. Cl.$^7$ .............................. G01B 5/20; G01B 3/22
[52] U.S. Cl. .............................. 73/1.79; 33/550; 33/551; 33/546
[58] Field of Search .................. 73/1.79, 1.81; 33/550, 551, 546

[56] References Cited

U.S. PATENT DOCUMENTS

| | | | |
|---|---|---|---|
| 4,283,857 | 8/1981 | Graham et al. | 33/546 |
| 4,429,464 | 2/1984 | Burrus | 73/1.79 |
| 4,918,972 | 4/1990 | Kenny et al. | 73/1.79 |
| 5,134,781 | 8/1992 | Baker | 73/1.79 |
| 5,501,096 | 3/1996 | Stettner et al. | 73/1.79 |
| 5,567,864 | 10/1996 | Coon et al. | 73/1.79 |
| 5,780,714 | 3/1997 | Champaigne | 73/1.79 |

*Primary Examiner*—Hezron Williams
*Assistant Examiner*—Chad Soliz
*Attorney, Agent, or Firm*—Nixon Peabody LLP; David S. Safran

[57] ABSTRACT

There is provided a reference gage that has first and second reference planes parallel to one another and perpendicular to a rotational axis of the reference gage, and a distance between the reference planes is already known as a reference distance. To calibrate the measuring head, the measuring direction of the measuring head is set parallel to the rotational axis of the measuring head or the table on which the reference gage is placed, and a reference value of the reference distance on the reference gage is entered. Then, the reference distance is measured by the measuring head to acquire measured data, and a measured value of the reference distance is calculated from the measured data. The measuring head is calibrated so that the measured value accords with the reference value. The time required for calibrating the measuring head is thus reduced.

9 Claims, 3 Drawing Sheets

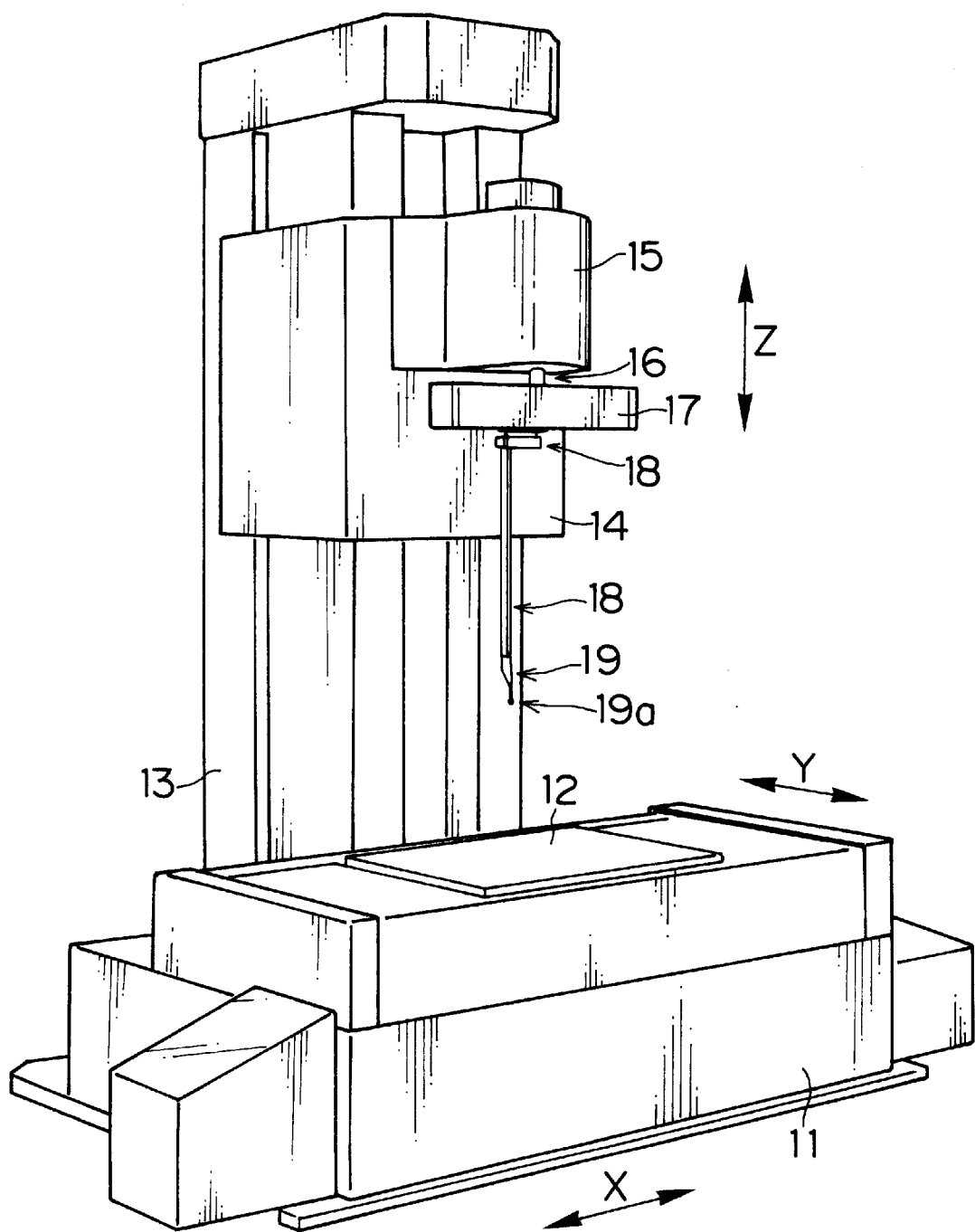
F I G. 1

ROUNDNESS MEASURING INSTRUMENT AND MEASURING HEAD CALIBRATION METHOD THEREFOR

BACKGROUND OF THE INVENTION

1. Field of the Invention

The present invention relates generally to a shape measuring instrument and a measuring head calibration method therefor, and more particularly to a roundness measuring instrument which measures a shape of a workpiece such as roundness and cylindricity and a measuring head calibration method therefor.

2. Description of Related Art

Examples of the roundness measuring instruments are: a table rotating type roundness measuring instrument in which an object of measurement or a workpiece is placed on a rotary table provided on a base and is measured by a fixed or vertically moved measuring head provided on a column; and a measuring head rotating type roundness measuring instrument in which the workpiece is placed on an unrotatable table and is measured by a measuring head that is rotated and vertically moved. The table rotating type roundness measuring instrument is used for small workpieces, whereas the measuring head rotating type roundness measuring instrument is used for large workpieces.

A description will be given of an example of the measuring head rotating type roundness measuring instrument. As shown in FIG. 1, an XY-table 12 is supported on a base 11 in such a way as to move in horizontal directions (XY-directions). A column 13 stands on the base 11, and a Z-table 14 is supported on the column 13 in such a way as to move in a vertical direction (Z-direction). A rotation supporting part 15 is provided on the Z-table 14, and a spindle 16, which rotates on a vertical axis, is built in the rotation supporting part 15. A supporting arm 17 is attached to the end of the spindle 16, and a measuring head holder 18 is mounted on the supporting arm 17 in such a way as to move along the supporting arm 17 (in a horizontal direction). A measuring head 19 provided with a contact 19a is attached at an end 18a of the measuring head holder 18.

To measure the workpiece in the measuring head rotating type roundness measuring instrument which is constructed in the above-mentioned manner, the XY-table 12 moves to bring the center of the measured area of the workpiece substantially to the rotational center of the measuring head 19 (within an area where the measuring head 19 is capable of measuring the workpiece). Then, the contact 19a is pressed onto the circumferential surface of the workpiece and the spindle 16 rotates the measuring head 19 to measure the shape of the circumferential surface of the workpiece, and the roundness of the horizontal section of the workpiece is calculated from the measurement data.

A description will be given of an example of the table rotating type roundness measuring instrument. As shown in FIG. 2, a rotary table 22, which rotates on a vertical axis, is provided on a base 21. A column 23 stands on the base 21, and a Z-table 24 is supported on the column 23 in such a way as to move in a vertical direction (Z-direction). A measuring head holder 25 is supported on the Z-table 24 in such a way as to move in a horizontal direction (X-direction). A measuring head 26 provided with a contact 26a is attached at an end 25a of the measuring head holder 25. The position in Y-direction of the contact 26a substantially corresponds to that of the rotational center of the rotary table 22.

To measure the workpiece in the table rotating type roundness measuring instrument which is constructed in the above-mentioned manner, the workpiece is placed on the rotary table 22 so that the center of the measured area of the workpiece is substantially on the rotational center of the rotary table 22 (within an area where the measuring head 26 is capable of measuring the workpiece). Then, the coast 26a is pressed onto the circumferential surface of the workpiece and the rotary table 22 is rotated to measure the shape of the circumferential surface of the workpiece, and the roundness of the horizontal section of the workpiece is calculated from the measurement data.

In the measuring head rotating type roundness measuring instrument and the table rotating type roundness measuring instrument, the measuring heads 19 and 26 can be moved vertically by the Z-tables 14 and 24, and thus, the roundness of the workpiece can be measured at an arbitrary height. It is therefore possible to calculate the coaxiality and cylindricity of the workpiece from the roundness data on a plurality of measured sections. It is also possible to measure the straightness of the workpiece by vertically moving the measuring heads 19 and 26 without rotating the measuring head 19 and the rotary table 22.

A differential transformer is used for the measuring heads 19 and 26. Since the differential transformer is analog, it is necessary to calibrate the measuring head prior to the measurement of the workpiece by measuring a reference gage such as a block gage so that the shape data acquired by measuring the reference gage can exactly correspond to true shape data of the reference gage. For this reason, there is the necessity for calibrating the measuring head over again if the contact 19a or 26a is changed or the surrounding conditions are changed, etc.

To calibrate the measuring head, the measuring head 19 is detached from the end 18a of the measuring head holder 18, or the measuring head 26 is detached from the end 25a of the measuring head holder 25, and then, the measuring head 19 or 26 is attached to a separately-provided attachment base.

Thus, it takes much time to calibrate the measuring heads 19 and 26 since they must be detached. In addition, there is the necessity for separately providing the attachment base, on which the measuring heads 19 and 26 are attached to be calibrated.

SUMMARY OF THE INVENTION

This invention has been developed in view of the above-described circumstances, and has as its object the provision of a shape measuring instrument and a measuring head calibration method therefor that reduce the time required for calibrating a measuring head and eliminates the necessity of separately providing an attachment base, on which the measuring head is attached to be calibrated.

To achieve the above-mentioned object, the present invention is directed to a shape measuring instrument, comprising: a measuring head for measuring a shape of a workpiece; a table on which the workpiece is placed, one of the measuring head and the table being rotated on an axis while a measuring direction of the measuring head is set perpendicular to the axis to thereby measure the shape of a section of the workpiece perpendicular to the axis; a reference gage placed on the table, the reference gage having first and second reference planes parallel to one another and perpendicular to the axis, a distance between the reference planes being already known as a reference distance; a terminal for receiving a reference value of the reference distance on the reference gage; a calculating part for calculating a measured value of the reference distance on the reference gage from measured data acquired by measuring the reference distance on the reference gage by the measuring head of which the measuring direction is set parallel to the axis; and a calibrating part for calibrating the measuring head so that the measured value accords with the reference value.

To achieve the above-mentioned object, the present invention is directed to a measuring head calibration method for a shape measuring instrument in which a workpiece is placed on a table and one of the table and a measuring head for measuring a shape of the workpiece is rotated on an axis while a measuring direction of the measuring head is set perpendicular to the axis to thereby measure the shape of a section of the workpiece perpendicular to the axis, the measuring head calibration method comprising the steps of: setting the measuring direction of the measuring head parallel to the axis; placing a reference gage on the table, the reference gage having first and second reference planes parallel to one another and perpendicular to the axis, a distance between the reference planes being already known as a reference distance; entering a reference value of the reference distance on the reference gage; measuring the reference distance on the reference gage by the measuring head to acquire measured data; calculating a measured value of the reference distance on the reference gage from the measured data; and calibrating the measuring head so that the measured value accords with the reference value.

Since a path of the measuring head on the reference gage is a circle, the reference planes must be on the circle. Then, on the reference gage, the first and second reference planes are preferably provided on a circle of which center is a rotational center of the reference gage. The reference gage may be a cylinder, the first reference plane being a surface of an end of the cylinder and the second reference plane being a surface of a recessed portion formed at the end of the cylinder.

To achieve the above-mentioned object, the present invention is directed to a reference gage, having first and second reference planes parallel to one another and perpendicular to a rotational axis of the reference gage, a distance between the reference planes being already known as a reference distance. On the reference gage, the first and second reference planes are preferably provided on a circle of which center is on the rotational axis. The reference gage may be a cylinder, the first reference plane being a surface of an end of the cylinder and the second reference plane being a surface of a recessed portion formed at the end of the cylinder.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view illustrating the appearance of a measuring head rotating type roundness measuring instrument;

DETAILED DESCRIPTION OF THE PREFERRED EMBODIMENT

This invention will be described in further detail by way of example with reference to the accompanying drawings.

Figure 3:
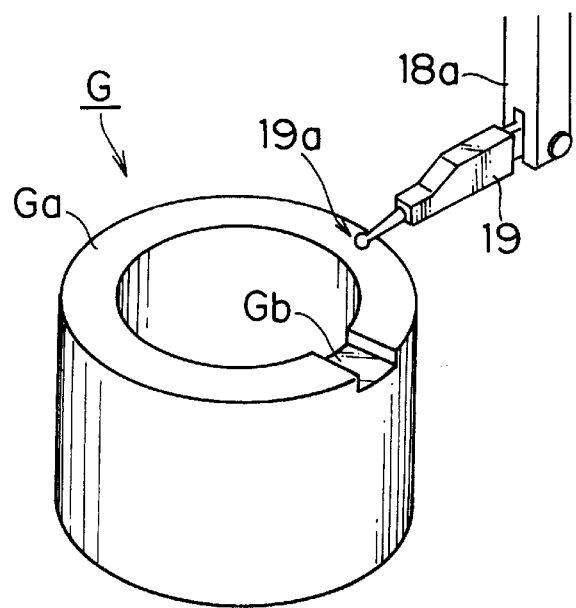
FIG. 3 is a perspective view illustrating a reference gage in an embodiment according to the present invention.

FIG. 3 shows a reference gage and a measuring head in an embodiment of a roundness measuring instrument and the measuring head calibration method according to the present invention. This embodiment applies to the measuring head rotating type roundness measuring instrument. As shown in FIG. 3, the reference gage G is cylindrical, and a recessed portion is formed at an end of the cylinder. A surface of the end of the cylinder is a first reference plane Ga, and a surface of the recessed portion is a second reference plane Gb. The two reference planes Ga and Gb are parallel to one another and perpendicular to the axis of the cylinder. There is a difference of 10–20 $\mu$m in height (distance) between the reference planes Ga and Gb (the difference is exaggeratedly shown in FIG. 3 to be easily understood), and this distance is already known as a reference distance.

Figure 4:
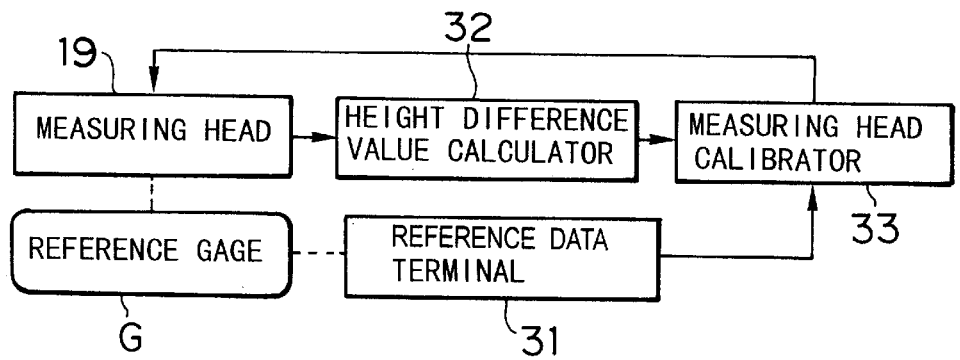
FIG. 4 is a block diagram illustrating the roundness measuring instrument in an embodiment according to the present invention.

FIG. 4 is a block diagram illustrating the inner structure of the roundness measuring instrument according to the embodiment of the present invention. During calibrating, the measuring head 19 measures the reference gage G and outputs measuring data. A reference data terminal 31 receives an already-known reference value of the reference distance on the reference gage G. A height difference calculator 32 calculates a measured value of the height difference (reference distance) between the reference planes Ga and Gb on the reference gage G from the measuring data acquired by measuring the reference gage G by the measuring head 19. A measuring head calibrator 33 calibrates the measuring head 19 so that the measured value accords with the reference value.

Figure 5:
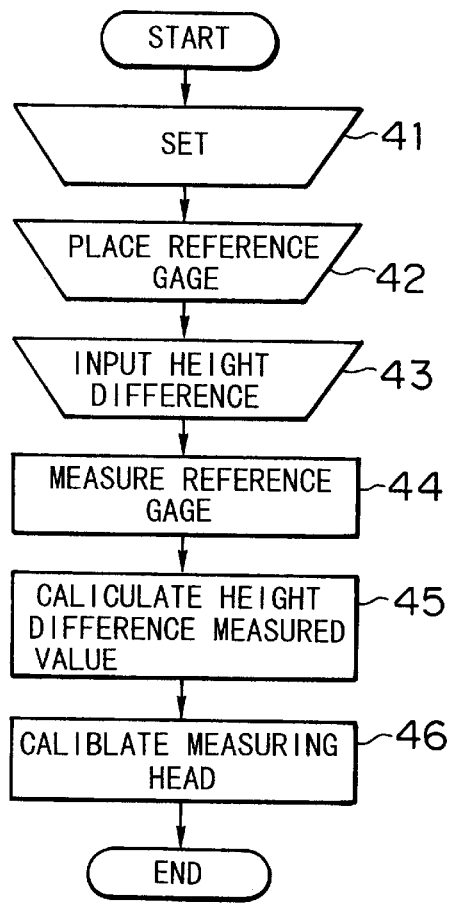
FIG. 5 is a flow chart describing a measuring head calibration method in an embodiment according to the present invention.

FIG. 5 is a flow chart describing a measuring head calibration method in an embodiment according to the present invention. First, the measuring direction of the measuring head 19 is set in Z-direction (step 41), and the reference gage G is placed on the table 12 as shown in FIG. 3 (step 42). In this case, the reference planes Ga and Gb on the reference gage G are set perpendicular to the rotary axis of the measuring head 19 (the axis of the spindle 16). Next, the reference value of the difference in the height between the reference planes Ga and Gb (the reference distance) on the reference gage G is entered through the reference data terminal 31 (step 43). Then, the measuring head 19 is rotated to measure the reference planes Ga and Gb on the reference gage G (step 44). Consequently, the height difference measured data is acquired, and a height difference measured value is calculated from the measured data (step 45). Then, the measuring head 19 is calibrated so that the acquired height difference measured value can accord with the entered reference value of the height difference (step 46).

After the calibration of the measuring head 19, the measuring direction of the measuring head 19 is set horizontal to measure the workpiece.

Figure 2:
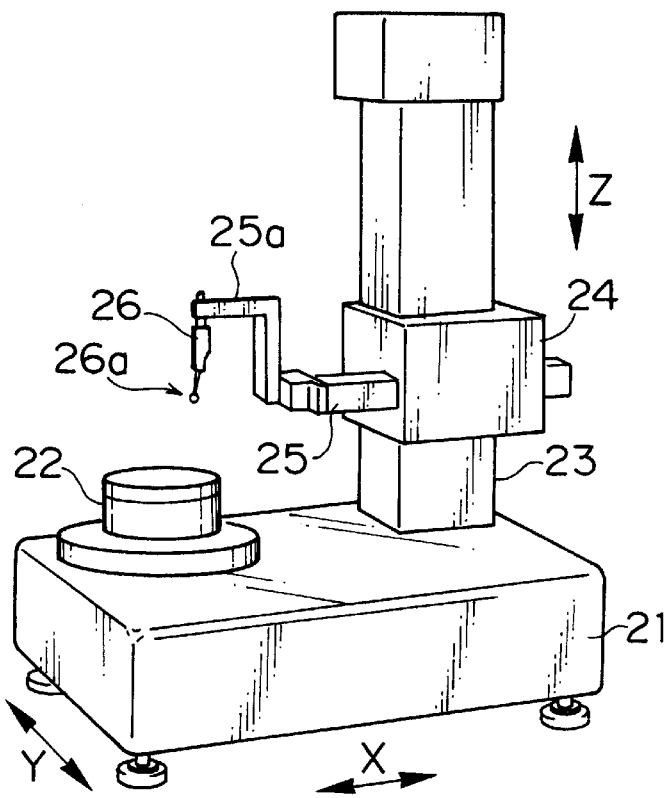
FIG. 2 is a view illustrating the appearance of a table rotating type roundness measuring instrument.

Although these embodiments are applied to the measuring head rotating type measuring instrument, but, of course, the present invention may also be applied to the table rotating type roundness measuring instrument shown in FIG. 2.

In FIG. 3, the reference gage G is shown as the hollow cylinder, but the reference gage G may be a solid cylinder. Moreover, the reference gage preferably has a shape of which rotational center is easily recognized, but is not restricted to the cylinder. For example, the reference gage may be a regular prism having any number of edges such as a triangular prism, a quadratic prism, a pentagonal prism, and so on. The reference planes are provided at an end of the prism on a circle of which center is on the axis of the prism.

As set forth hereinabove, according to the roundness measuring instrument of the present invention, the reference gage with the two parallel reference planes, of which height difference is already known, is set on the table on which the workpiece is placed. Then, the measuring head or the table is rotated to measure the reference planes on the reference gage, and the measuring head is calibrated so that the measured height difference can accord to the already-known reference height difference.

It is therefore unnecessary to attach and detach the measuring head, and thus, the measuring head can be calibrated in a short period of time, and there is no necessity of separately providing the attachment base, on which the measuring head is attached to be calibrated.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A shape measuring instrument, comprising:
    a measuring head for measuring a shape of a workpiece;
    a table on which the workpiece is placed, one of the measuring head and the table being rotated on an axis while a measuring direction of the measuring head is set perpendicular to the axis to thereby measure the shape of a section of the workpiece perpendicular to the axis;
    a reference gage placed on the table, the reference gage having first and second reference planes parallel to one another and perpendicular to the axis, a distance between the reference planes being already known as a reference distance;
    a terminal for receiving a reference value of the reference distance on the reference gage;
    a calculating part for calculating a measured value of the reference distance on the reference gage from measured data acquired by measuring the reference distance on the reference gage by the measuring head of which the measuring direction is set parallel to the axis; and
    a calibrating part for calibrating the measuring head so that the measured value accords with the reference value.

2. The shape measuring instrument as defined in claim 1, wherein the first and second reference planes are provided on a circle of which center is a rotational center of the reference gage.

3. The shape measuring instrument as defined in claim 2, wherein the reference gage is an cylinder, the first reference plane being a surface of an end of the cylinder and the second reference plane being a surface of a recessed portion formed at the end of the cylinder.

4. A measuring head calibration method for a shape measuring instrument in which a workpiece is placed on a table and one of the table and a measuring head for measuring a shape of the workpiece is rotated on an axis while a measuring direction of the measuring head is set perpendicular to the axis to thereby measure the shape of a section of the workpiece perpendicular to the axis, the measuring head calibration method comprising the steps of:
    setting the measuring direction of the measuring head parallel to the axis;
    placing a reference gage on the table, the reference gage having first and second reference planes parallel to one another and perpendicular to the axis, a distance between the reference planes being already known as a reference distance;
    entering a reference value of the reference distance on the reference gage;
    measuring the reference distance on the reference gage by the measuring head to acquire measured data;
    calculating a measured value of the reference distance on the reference gage from the measured data; and
    calibrating the measuring head so that the measured value accords with the reference value.

5. The measuring head calibration method as defined in claim 4, wherein the first and second reference planes are provided on a circle of which center is a rotational center of the reference gage.

6. The measuring head calibration method as defined in claim 5, wherein the reference gage is an cylinder, the first reference plane being a surface of an end of the cylinder and the second reference plane being a surface of a recessed portion formed at the end of the cylinder.

7. A reference gage, having first and second reference planes parallel to one another and perpendicular to a rotational axis of the reference gage, a distance between the reference planes measured parallel to the rotational axis and being already known as a reference distance.

8. The reference gage as defined in claim 7, wherein the first and second reference planes are provided on a circle of which the center is on the rotational axis.

9. The reference gage as defined in claim 8, wherein the reference gage is an cylinder, the first reference plane being a surface of an end of the cylinder and the second reference plane being a surface of a recessed portion formed at the end of the cylinder.

* * * * *